Aug. 16, 1938. S. G. OSBORNE 2,126,803
METHOD FOR PRODUCTION OF HYDROGEN CHLORIDE
Original Filed Oct. 26, 1934
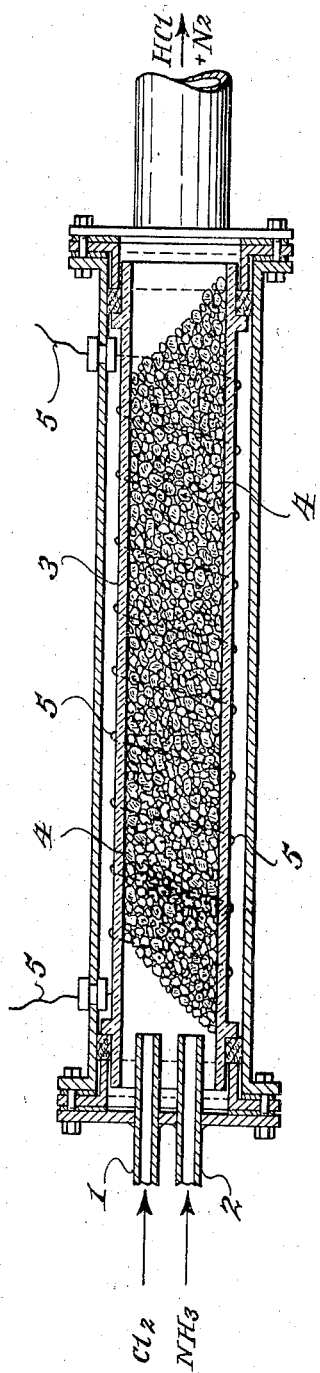
INVENTOR
Sidney G. Osborne
BY
Kenneth E. Stuart
ATTORNEY Patented Aug. 16, 1938

2,126,803

UNITED STATES PATENT OFFICE 2,126,803

METHOD FOR PRODUCTION OF HYDROGEN CHLORIDE

Sidney G. Osborne, New York, N. Y., assignor to Hooker Electrochemical Company, New York, N. Y., a corporation of New York Original application October 26, 1934, Serial No. 750,185. Divided and this application October 9, 1937, Serial No. 168,256

4 Claims. (Cl. 23—256)

Hydrogen chloride is a by-product of many chemical processes involving chlorination by substitution. In such processes, more often than otherwise, there is no demand for this acid. It may, of course, be absorbed in water and sold as muriatic acid; but, because of the high vapor pressure of hydrogen chloride, it cannot be economically liquefied and shipped as such and no way has yet been found by which it can be conveniently delivered at a distance. Industries requiring hydrogen chloride are therefore obliged to produce it themselves.

Two typical examples of uses for hydrogen chloride, and more particularly anhydrous hydrogen chloride, are afforded by the production of monochlorides from olefines and chlorides of metals from their oxides.

Another use for anhydrous HCl is in the selective removal of cotton from cotton-wool mixtures by hydrolysis of the cellulose to water-soluble sugars. By an analogous reaction, sawdust and waste wood are beginning to be converted on a commercial scale to glucose.

For production of anhydrous hydrogen chloride, the reaction of sulphuric acid upon common salt has generally been employed. In this reaction the acid is admitted to a reactor containing the salt; but when the acid is shut off the salt, wet with acid, goes on generating HCl for a time. Hence this reaction is not readily controllable. There are other objections to this process, such as the necessity for periodically cleaning out a mass of sodium sulphate from the reactor. It is desirable that the reaction be of such a nature that it can be quickly started and instantly stopped.

The simplest way in which to produce anhydrous hydrogen chloride is, of course, to burn hydrogen and chlorine together, and this method is used when hydrogen and chlorine are available. But while chlorine may be easily liquefied for shipment, hydrogen cannot be liquefied by commercial means and although, for special purposes, it is shipped under high pressure in cylinders, the weight of the container is so great compared with that of the hydrogen that the freight charge becomes prohibitive for most commercial purposes.

When the hydrogen is combined with nitrogen, the resulting ammonia may be readily liquefied; and, although it is only 17.6 per cent hydrogen by weight, far more hydrogen can be introduced into a given pressure cylinder for shipment in the form of ammonia than in the form of pure hydrogen. The ammonia may then be subjected to heat and decomposed into its components and the hydrogen used as desired. Thus the delivery of hydrogen for industrial purposes becomes feasible. The nitrogen, being inert, is generally no detriment. This method of delivering hydrogen is not new, but it requires the application of external heat and has not been used for production of hydrogen chloride.

My invention consists substantially in decomposing or cracking ammonia into its components, burning the hydrogen thus produced with chlorine gas and using the heat thus generated to crack more ammonia, in accordance with the equations:

$$2NH_3 \xrightarrow{\Delta} 3H_2 + N_2 \qquad (1)$$

$$H_2 + Cl_2 \rightarrow 2HCl \qquad (2)$$

The reaction of chlorine and hydrogen is, of course, highly exothermic and the heat generated is more than sufficient to crack the ammonia. The presence of the nitrogen is an advantage as it moderates the temperature developed during the process. In the subsequent use of the hydrogen chloride the presence of the nitrogen may likewise be of advantage and for the same reason, as anhydrous hydrogen chloride reacts with many substances with liberation of much heat.

In the figure there is illustrated, partly in section, one type of apparatus for carrying out my process.

Referring to the figure:

The chlorine and ammonia are admitted in close proximity to each other, through pipes 1 and 2 respectively, to reaction tube 3, which is filled with suitable contact material as illustrated at 4, 4. Reaction chamber 3 may be of "vitreosil" and provided with a coil of nichrome wire 5 serving to preheat it. The tube 3 and contact material 4 having been preheated to approximately 800° C., the ammonia and chlorine may be admitted thereto. A portion of these gases will of course immediately react to form ammonium chloride, in accordance with the equation:

$$8NH_3 + 3Cl_2 = 6NH_4Cl + N_2 \qquad (3)$$

An instant later, coming into contact with the hot contact material, the ammonium chloride breaks down in accordance with the equation:

$$2NH_4Cl \xrightarrow{\Delta} 3H_2 + 2HCl + N_2 \qquad (4)$$

and more chlorine reacts with the hydrogen of equation (4) to form more HCl in accordance with equation (2).

The net result of reactions (3), (4) and (2) being exothermic, the temperature of the contact material tends to rise to a point at which reaction (3) cannot occur. If this is allowed to happen the reaction may, in part at least, take the form:

$$2NH_3 + 3Cl_2 \rightarrow 6HCl + N_2 \qquad (5)$$

In the type of apparatus illustrated, if the chlorine is in excess of the proportion required under equation (3) and if the temperature is sufficiently low the chlorine is likely to combine with the nitrogen to form nitrogen chloride, in accordance with the equations:

$$4NH_3 + 3Cl_2 \rightarrow 3NH_4Cl + NCl_3 \qquad (6)$$

$$NH_4Cl + 3Cl_2 \rightarrow 4HCl + NCl_3 \qquad (7)$$

As nitrogen chloride decomposes explosively at 93° C., or at a lower temperature in presence of certain substances, it is necessary to see that the apparatus is adequately preheated before admitting the gases and it is preferable to admit ammonia first.

The contact material 4 may be any material that will not react with chlorine or fuse or sublime at the temperature of the reaction. Alkaline earth metal chlorides are suitable for the purpose. One of the best materials I have found is calcium chloride, which appears to have a catalytic effect upon the reaction.

If the capacity of the apparatus be exceeded, the temperature will fall and may reach a point at which the reaction will assume a different character. The temperature is therefore maintained at the desired point by regulating the streams of ammonia and chlorine admitted to the reactor.

Liquefied chlorine and ammonia are commonly shipped in standard commercial pressure cylinders provided with shut-off valves. These are connected to pipes 1 and 2 respectively. The chlorine and ammonia are taken off in gas phase. The cylinders may, if necessary, be immersed in tanks of hot water to supply heat of vaporization. These cylinders are not shown as they form no part of the invention and their construction is well known.

By means of this simple apparatus a dependable, controllable and economical supply of anhydrous hydrogen chloride may be assured.

This application is a division of my co-pending application Serial No. 750,185, filed October 26, 1934.

What I claim is:

1. The method of reacting ammonia with chlorine which comprises conducting them into contact with calcium chloride maintained at or above substantially 800° C., whereby products of reaction consisting principally of hydrogen chloride and free nitrogen result.

2. The method of reacting ammonia with chlorine which comprises continuously conducting them into contact with calcium chloride in a reaction chamber previously heated to a temperature at which in the presence of calcium chloride ammonia is decomposed and regulating the supply of said ammonia and said chlorine to the capacity of said chamber to maintain said chamber at said temperature, whereby products of reaction consisting principally of hydrogen chloride and free nitrogen result.

3. The method of reacting ammonia with chlorine which comprises continuously conducting them into contact with calcium chloride in a reaction chamber previously heated to not less than 800° C. and regulating the supply of said ammonia and said chlorine to the capacity of said chamber to maintain said chamber at not less than said temperature, whereby products of reaction consisting principally of hydrogen chloride and free nitrogen result.

4. The method of reacting anhydrous ammonia with anhydrous chlorine which comprises continuously conducting them into contact with calcium chloride in a reaction chamber previously heated to a temperature at which in presence of calcium chloride ammonia is decomposed and regulating the supply of said ammonia and said chlorine to the capacity of said chamber to maintain said chamber at said temperature, whereby anhydrous products of reaction consisting principally of hydrogen chloride and free nitrogen result.

SIDNEY G. OSBORNE.